(12) United States Patent
Demare et al.

(10) Patent No.: US 9,174,532 B2
(45) Date of Patent: Nov. 3, 2015

(54) FUEL TANK SLOSH ABSORBER

(71) Applicant: GM GLOBAL TECHNOLOGY OPERATIONS LLC, Detroit, MI (US)

(72) Inventors: Kristin M. Demare, Rochester Hills, MI (US); William L. Villaire, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 148 days.

(21) Appl. No.: 13/973,288

(22) Filed: Aug. 22, 2013

(65) Prior Publication Data

US 2015/0053693 A1 Feb. 26, 2015

(51) Int. Cl.
*B60K 15/077* (2006.01)
*B60K 15/03* (2006.01)

(52) U.S. Cl.
CPC ....... *B60K 15/077* (2013.01); *B60K 2015/0344* (2013.01); *B60K 2015/0775* (2013.01)

(58) Field of Classification Search
CPC ............... B60K 2015/0777; B60K 2015/0344; B60K 2015/0775
USPC ................................. 220/563, 734
See application file for complete search history.

(56) References Cited

U.S. PATENT DOCUMENTS

| 2,840,259 | A | * | 6/1958 | Steidl | 220/563 |
| 3,645,416 | A | * | 2/1972 | Main, Jr. | 220/563 |
| 5,960,981 | A | * | 10/1999 | Dodson et al. | 220/563 |
| 6,499,620 | B1 | * | 12/2002 | Boguet et al. | 220/563 |
| 2004/0211782 | A1 | * | 10/2004 | Howe | 220/495.06 |

* cited by examiner

*Primary Examiner* — Fenn Mathew
*Assistant Examiner* — Don M Anderson
(74) *Attorney, Agent, or Firm* — Quinn Law Group, PLLC

(57) ABSTRACT

A fuel tank includes a structural body and a membrane. The membrane extends vertically between and is attached to a top wall and a bottom wall of the structural body, and substantially extends between a first side wall and a second side wall of the structural body. The membrane defines a plurality of venting apertures operable to allow liquid fuel to move therethrough. The membrane is flexible, and includes a length, measured between a top edge and a bottom edge of the membrane, that is greater than a height of the structural body, which is measured between the top wall and the bottom wall of the structural body. The flexibility of the membrane and the length of the membrane allow the membrane to flex and move to absorb kinetic energy of fuel moving within the structural body.

20 Claims, 2 Drawing Sheets

FUEL TANK SLOSH ABSORBER

TECHNICAL FIELD

The invention generally relates to a fuel tank of a vehicle.

BACKGROUND

Fuel tanks store a quantity of fuel. When in motion, the fuel stored within the fuel tank may move or slosh within the fuel tank. Vehicular fuel tanks often include one or more baffles disposed within the fuel tank. The baffles are operable to break-up a slosh wave of the fuel moving within the fuel tank to reduce noise generated by the slosh wave contacting the various walls of the fuel tank.

SUMMARY

A fuel tank for a vehicle is provided. The fuel tank includes a structural body and a membrane. The structural body includes a top wall, a bottom wall disposed vertically below the top wall, a first side wall extending between the top wall and the bottom wall, and a second side wall extending between the top wall and the bottom wall. The second side wall is disposed opposite the first side wall. The membrane includes a top edge attached to the top wall, and a bottom edge attached to the bottom wall. The membrane substantially extends between the first side wall and the second side wall, and defines a plurality of venting apertures operable to allow liquid fuel to move therethrough. The membrane is flexible, and includes a length. The length is measured between the top edge and the bottom edge of the membrane. The length is greater than a height of the structural body. The height of the structural body is measured between the top wall and the bottom wall of the structural body. The flexibility of the membrane and the length of the membrane allow the membrane to flex and move to absorb kinetic energy of fuel moving within the structural body.

Accordingly, the membrane of the fuel tank breaks up the fuel moving within the structural body of the fuel tank, i.e., a slosh wave, thereby reducing slosh noise from the slosh wave contacting the various side walls of the structural body. Furthermore, because the membrane may flex when contacted by the slosh wave, the membrane may absorb energy of the slosh wave, i.e., the membrane provide a "ride down" controlled energy management feature, to reduce the amount of kinetic energy of the moving fuel that is available to generate slosh noise.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Figure 1:
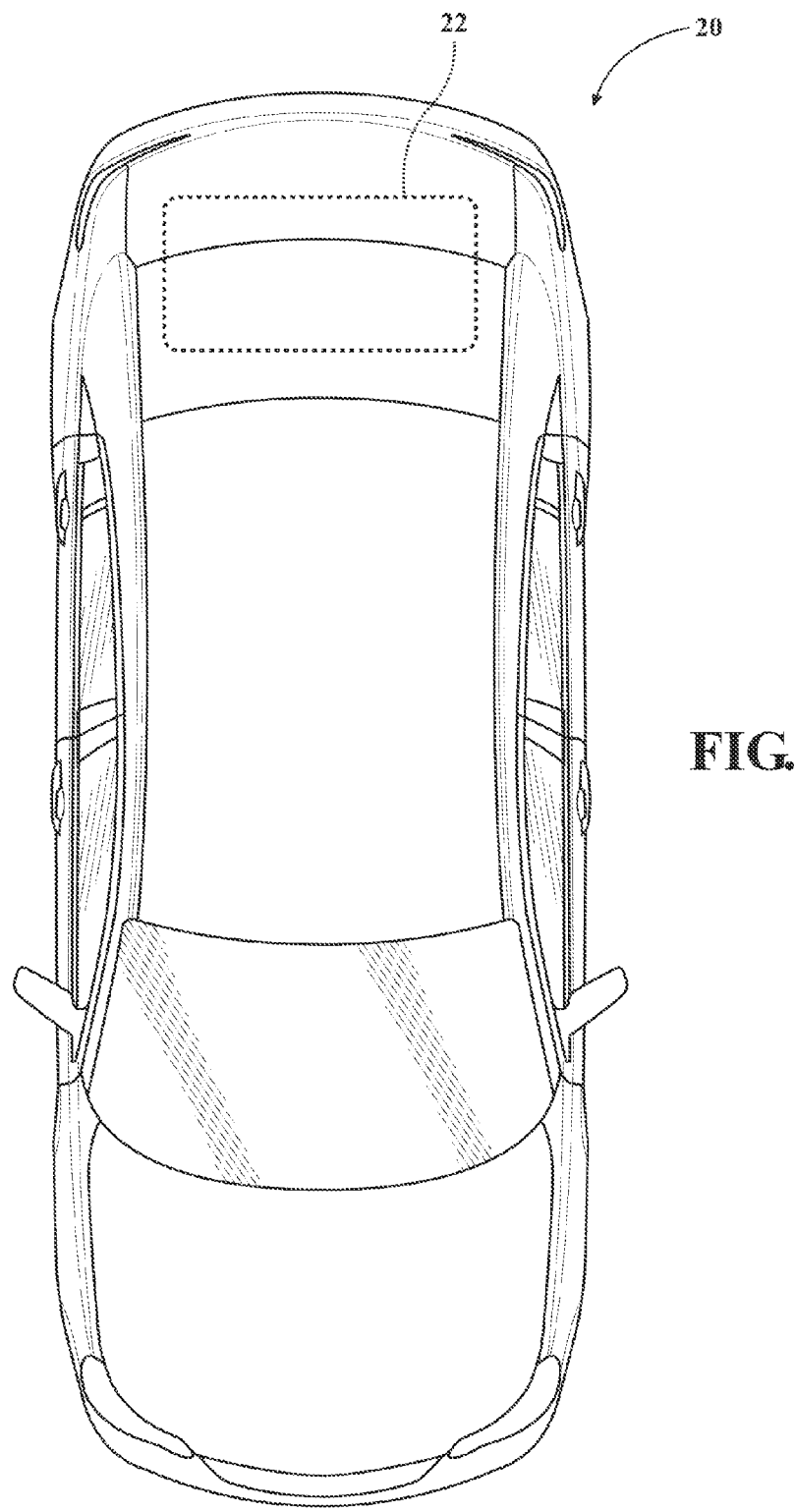
FIG. 1 is a schematic plan view of a vehicle showing a fuel tank thereof.

Referring to the Figures, wherein like numerals indicate like parts throughout the several views, a vehicle is generally shown at 20 in FIG. 1. The vehicle 20 includes fuel tank 22 for storing a fuel 24 therein. The fuel 24 may include, but is not limited to, gasoline, diesel fuel, or a flexible fuel, e.g., E85. The fuel tank 22 is sized, shaped, and configured to meet the design and packaging restraints for each specific vehicle. Accordingly, the fuel tank 22 may include any size, shape, and/or configuration.

Figure 2:
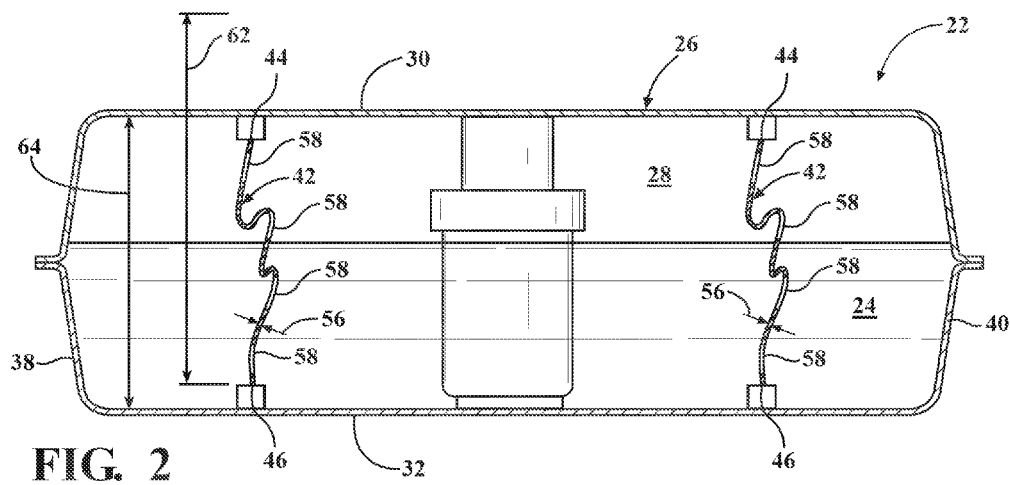
FIG. 2 is a schematic cross sectional view of the fuel tank showing fuel within the fuel tank in a stagnant, non-moving state.
Figure 3:
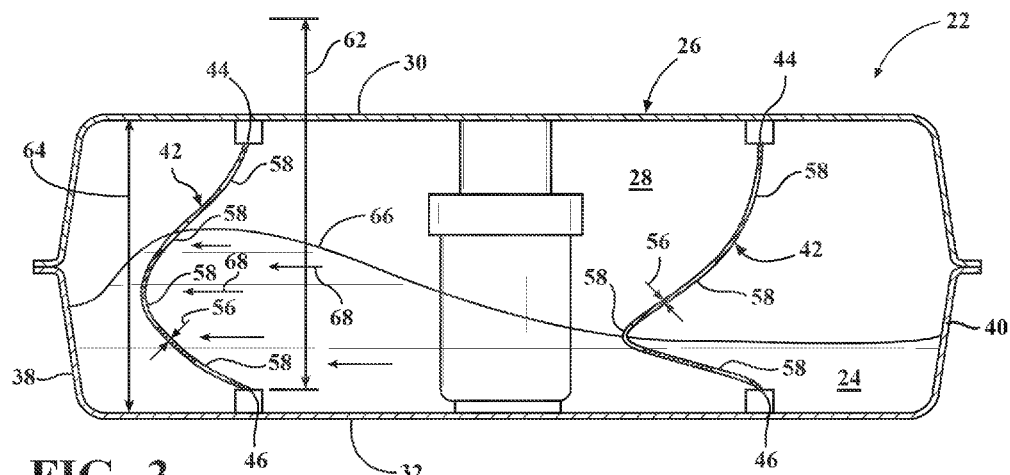
FIG. 3 is a schematic cross sectional view of the fuel tank showing a wave of fuel moving within the fuel tank.
Figure 4:
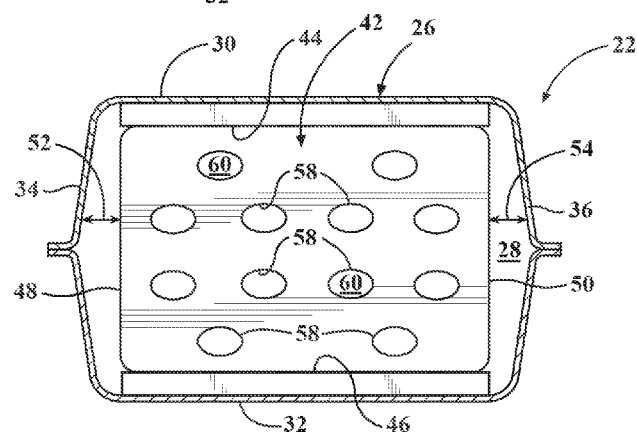
FIG. 4 is a schematic cross sectional view of the fuel tank perpendicular to the longitudinal axis showing a plurality of venting apertures of a membrane of the fuel tank.

Referring to FIGS. 2 through 4, the fuel tank 22 includes a structural body 26, which defines an interior cavity 28. The structural body 26 may include and be manufactured from any suitable material, such as but not limited to a metal material, or more preferably, a plastic material. The fuel 24 is stored within the interior cavity 28 of the structural body 26. As shown, the structural body 26 defines a generally rectangular or cubicle shape. However, it should be appreciated that the shape of the structural body 26 may differ from the schematic exemplary embodiment described and shown herein. The structural body 26 includes a top wall 30, a bottom wall 32, a first side wall 34, a second side wall 36, a first end wall 38, and a second end wall 40. The bottom wall 32 is disposed vertically below the top wall 30. The first side wall 34, the second side wall 36, the first end wall 38, and the second end wall 40 each extend between the top wall 30 and the bottom wall 32. The second side wall 36 is disposed opposite the first side wall 34. The first end wall 38 is disposed opposite the second end wall 40. The first end wall 38 and the second end wall 40 extend between the first side wall 34 and the second side wall 36, and the first side wall 34 and the second side wall 36 extend between the first end wall 38 and the second end wall 40. The interior cavity 28 of the structural body 26 is defined between and bounded by the top wall 30, the bottom wall 32, the first side wall 34, the second side wall 36, the first end wall 38, and the second end wall 40.

The fuel tank 22 includes a membrane 42 that is disposed within the interior cavity 28 of the structural body 26. As shown, the fuel tank 22 includes two membranes 42. However, it should be appreciated that the fuel tank 22 may include more than the two membranes 42 shown, or may include only a single membrane 42. Referring to FIG. 4, the membrane 42 includes a top edge 44, a bottom edge 46, a first vertical edge 48, and a second vertical edge 50, which bound and defines a perimeter of the membrane 42. The top edge 44 is attached to the top wall 30, and the bottom edge 46 is attached to the bottom wall 32. The top edge 44 and the bottom edge 46 may be attached to the top wall 30 and the bottom wall 32 of the structural body 26 in any suitable manner. For example, the membrane 42 may be welded, via a plastic-to-plastic weld, during manufacture of the tank 22.

The membrane 42 extends completely between the top wall 30 and the bottom wall 32. Additionally, the membrane 42 substantially extends between the first side wall 34 and the second side wall 36. However, the membrane 42 is not attached to either of the first side wall 34 or the second side wall 36. The first vertical edge 48 of the membrane 42 is disposed adjacent the first side wall 34, and the second vertical edge 50 of the membrane 42 is disposed adjacent the second side wall 40. A first gap 52 is disposed between the first vertical edge 48 of the membrane 42 and the first side wall 34. A second gap 54 is disposed between the second vertical edge 50 of the membrane 42 and the second side wall 36. Preferably, the first gap 52 and the second gap 54 are each within the range of 25 mm and 50 mm. However, it should be appreciated that the first gap 52 and the second gap 54 may vary from the exemplary range provided herein.

The membrane 42 may include and be manufactured from one of, but is not limited to, a high density polyethylene film material, or a polyoxymethylene co-polymer film material. It should be appreciated that the specific material used to manufacture the membrane 42 is dependent upon that specific fuel 24 type that the fuel tank 22 is intended to contain. The material used to manufacture the membrane 42 should remain stable when exposed to the fuel 24 within the fuel tank 22. For example, if the fuel tank 22 is intended for storing gasoline, then the membrane 42 is manufactured from a material suitable for exposure to gasoline, whereas if the fuel tank 22 is intended for storing diesel fuel 24, then the membrane 42 is manufactured from a material suitable for exposure to diesel fuel 24.

Referring to FIGS. 2 and 3, the membrane 42 includes a cross sectional thickness 56. Preferably, the cross sectional thickness 56 of the membrane 42 is within the range of 1 mm and 5 mm. However, it should be appreciated that the cross sectional thickness 56 of the membrane 42 may vary depending upon the specific material used to manufacture the membrane 42, and that the cross sectional thickness 56 may vary from the exemplary range provided herein.

Referring to FIG. 4, the membrane 42 defines a plurality of venting apertures 58 that extend through the membrane 42. The venting apertures 58 are operable to allow the fuel 24 to move therethrough. Preferably, each of the venting apertures 58 includes an area 60 within the range of 150 mm$^2$ and 2000 mm$^2$. However, it should be appreciated that the area 60 of the venting apertures 58 may vary from the exemplary range provided herein. The membrane 42 defines a density of the venting apertures 58. The density of the venting apertures 58 is measured by the number of venting apertures 58 per square meter of the membrane 42. Preferably, the density of the venting apertures 58 is within the range of, 20 and 50 apertures/m$^2$. However, it should be appreciated that the density of the venting apertures 58 may vary from the exemplary range provided herein.

Referring to FIGS. 2 and 3, the membrane 42 is compliant and flexible, and includes an un-folded expanded length, which is measured between the top edge 44 and the bottom edge 46 of the membrane 42. The un-folded length of the membrane 42 is schematically represented by the reference dimension 62 shown in FIGS. 2 and 3. The length 62 of the membrane 42 is greater than a height 64 of the structural body 26. The height 64 of the structural body 26 is measured between the top wall 30 and the bottom wall 32 of the structural body 26. Preferably, the length 62 of the membrane 42 is between 100% and 140% of the height 64 of the structural body 26. However, it should be appreciated that the percentage difference between the length 62 of the membrane 42 and the height 64 of the structural body 26 may vary from the exemplary range provided herein. Because the length 62 of the membrane 42 is greater than the height 64 of the structural body 26, the membrane 42 is not drawn tightly between the top wall 30 and the bottom wall 32 of the structural body 26, and includes some slack that allows the membrane 42 to flex and move in response to movement of the fuel 24 within the interior cavity 28. The length 62 of the membrane 42 is limited by the shape, size, and/or configuration of the fuel tank 22, as well as other components of the fuel tank 22. The length 62 of the membrane 42 may not be so large as to interfere with any other components of the fuel tank 22 that are disposed within the interior cavity 28 of the fuel tank 22.

The flexure and movement of the membrane 42 allows the membrane 42 to absorb kinetic energy of moving fuel 24 within the interior cavity 28 of the structural body 26. FIG. 2 shows the fuel 24 within the interior cavity 28 in a stagnant, non-moving state, with the membrane 42 slack and forming folds therein due to the length 62 of the membrane 42 being greater than the height 64 of the structural body 26. FIG. 3 shows the fuel 24 within the interior cavity 28 moving from right to left on the page of FIG. 3, with the membrane 42 flexed and/or stretched to absorb the energy of the wave 66 of fuel 24.

As noted above, the membrane 42 is flexible, and may expand or stretch in response to movement of the fuel 24 within the interior cavity 28 to absorb kinetic energy of fuel 24 moving within the interior cavity 28. For example, the length 62 of the membrane 42 may increase between 0% and 120% of the initial length 62 of the membrane 42 during expansion of the membrane 42 to absorb the kinetic energy of the fuel 24 moving within the interior cavity 28.

Referring to FIG. 3, during operation of the vehicle 20, movement of the vehicle 20 may generate a wave 66, often referred to as a slosh wave 66, in the fuel 24 stored within the interior cavity 28 of the fuel tank 22. The wave 66 of FIG. 3 is shown moving in a direction indicated by arrows 68. As the wave 66 moves within the fuel tank 22, the wave 66 contacts the membrane 42. The fuel 24 flows through the venting apertures 58, which breaks up the wave 66 and reduces slosh noise associated with the slosh wave 66 contacting the walls of the fuel tank 22. Additionally, because the membrane 42 may move, flex, and/or stretch in response to the slosh wave 66 contacting the membrane 42, the membrane 42 is able to absorb some of the energy of the slosh wave 66, i.e., provide a ride down energy management structure for the slosh wave 66. The kinetic energy of the slosh wave 66 is transferred to the membrane 42 by moving the membrane 42. An amount of energy is required to move and/or stretch the membrane 42. The energy required to move and/or stretch the membrane 42 is transferred from the slosh wave 66 to the membrane 42, thereby reducing the kinetic energy of the slosh wave 66. Absorbing a portion of the energy of the slosh wave 66 reduces the amount of energy that is available to generate slosh noise, which reduces the slosh noise associated with the slosh wave 66.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:
1. A fuel tank for a vehicle, the fuel tank comprising:
a structural body having a top wall, a bottom wall disposed vertically below the top wall, a first side wall extending between the top wall and the bottom wall, and a second side wall extending between the top wall and the bottom wall, and disposed opposite the first side wall;
a membrane having a top edge attached to the top wall and a bottom edge attached to the bottom wall;

wherein the membrane substantially extends between the first side wall and the second side wall, and defines a plurality of venting apertures operable to allow liquid fuel to move therethrough; and wherein the membrane is flexible and includes an un-stretched length, measured between the top edge and the bottom edge of the membrane, that is greater than a height of the structural body, measured between the top wall and the bottom wall of the structural body, such that the membrane is operable to flex and move to absorb kinetic energy of moving fuel within the structural body.

2. A fuel tank as set forth in claim 1 wherein the un-stretched length of the membrane is between 30% and 50% greater than the height of the structural body.

3. A fuel tank as set forth in claim 1 wherein the membrane is one of a high density polyethylene film material, or a polyoxymethylene co-polymer film material.

4. A fuel tank as set forth in claim 1 wherein the membrane includes a cross sectional thickness within the range of 1 mm and 5 mm.

5. A fuel tank as set forth in claim 1 wherein the membrane is expandable to absorb kinetic energy of fuel moving within the structural body.

6. A fuel tank as set forth in claim 5 wherein the length of the membrane increases from the un-stretched length between 0% and 120% during expansion thereof to absorb the kinetic energy of fuel moving within the structural body.

7. A fuel tank as set forth in claim 1 wherein the membrane is not attached to either of the first side wall or the second side wall.

8. A fuel tank as set forth in claim 1 wherein each of the plurality of venting apertures includes an area within the range of 150 $mm^2$ and 2000 $mm^2$.

9. A fuel tank as set forth in claim 1 wherein the membrane includes a first vertical edge disposed adjacent the first side wall, and a second vertical edge disposed adjacent the second sidewall.

10. A fuel tank as set forth in claim 9 further comprising a first gap disposed between the first vertical edge of the membrane and the first side wall, and a second gap disposed between the second vertical edge of the membrane and the second side wall.

11. A fuel tank as set forth in claim 10 wherein the first gap and the second gap are each within the range of 25 mm and 50 mm.

12. A fuel tank comprising:
a structural body having a top wall, a bottom wall disposed vertically below the top wall, a first side wall extending between the top wall and the bottom wall, and a second side wall extending between the top wall and the bottom wall, and disposed opposite the first side wall; and
a membrane having a top edge attached to the top wall and a bottom edge attached to the bottom wall;
wherein the membrane substantially extends between the first side wall and the second side wall, and defines a plurality of venting apertures operable to allow liquid fuel to move therethrough;
wherein the membrane is flexible and includes an un-stretched length, measured between the top edge and the bottom edge of the membrane, that is between 100% and 140% of a height of the structural body, measured between the top wall and the bottom wall of the structural body, such that the membrane is operable to flex and move to absorb kinetic energy of moving fuel within the structural body; and
wherein the membrane is one of a high density polyethylene film material, or a polyoxymethylene co-polymer film material, and includes a cross sectional thickness within the range of 1 mm and 5 mm.

13. A fuel tank as set forth in claim 12 wherein the membrane is expandable to absorb kinetic energy of fuel moving within the structural body, such that the length of the membrane increases from the un-stretched length between 0% and 120% during expansion thereof.

14. A fuel tank as set forth in claim 13 wherein the membrane is not attached to either of the first side wall or the second side wall.

15. A fuel tank as set forth in claim 12 wherein each of the plurality of venting apertures includes an area within the range of 150 $mm^2$ and 2000 $mm^2$.

16. A vehicle comprising:
a fuel tank including:
a structural body having a top wall, a bottom wall disposed vertically below the top wall, a first side wall extending between the top wall and the bottom wall, and a second side wall extending between the top wall and the bottom wall, and disposed opposite the first side wall; and
a membrane having a top edge attached to the top wall and a bottom edge attached to the bottom wall;
wherein the membrane substantially extends between the first side wall and the second side wall, and defines a plurality of venting apertures operable to allow liquid fuel to move therethrough;
wherein the membrane includes an un-stretched length, measured between the top edge and the bottom edge of the membrane, that is greater than a height of the structural body, measured between the top wall and the bottom wall of the structural body; and
wherein the membrane is flexible and operable to expand to absorb kinetic energy of fuel moving within the structural body, such that the length of the membrane increases from the un-stretched length between 0% and 120% during expansion of the membrane.

17. A vehicle as set forth in claim 16 wherein the membrane is one of a high density polyethylene film material, or a polyoxymethylene co-polymer film material, and includes a cross sectional thickness within the range of 1 mm and 5 mm.

18. A vehicle as set forth in claim 16 wherein the un-stretched length of the membrane is between 100% and 140% of the height of the structural body.

19. A vehicle as set forth in claim 16 wherein each of the plurality of venting apertures includes an area within the range of 150 $mm^2$ and 2000 $mm^2$.

20. A vehicle as set forth in claim 16 wherein the membrane defines a density of the plurality of venting apertures per square meter within the range of 20 and 50 apertures/$m^2$.

* * * * *